United States Patent [19]

Kearns et al.

[11] Patent Number: 5,305,370
[45] Date of Patent: Apr. 19, 1994

[54] PERSONAL EMERGENCY RESPONSE COMMUNICATIONS SYSTEM

[76] Inventors: Lloyd Kearns, 10833 Scotsman Way, Rancho Cordova, Calif. 95620; David E. Petersen, 1888 Blubell Dr., Livermore, Calif. 94550

[21] Appl. No.: 755,539

[22] Filed: Sep. 4, 1991

[51] Int. Cl.⁵ .................... H04M 11/00; H04M 11/04
[52] U.S. Cl. .................................... 379/45; 379/40; 379/38; 379/39; 379/66; 379/388
[58] Field of Search ................ 379/45, 37, 38, 39, 379/40, 388, 389; 340/574

[56] References Cited

U.S. PATENT DOCUMENTS

| | | | |
|---|---|---|---|
| 3,989,900 | 11/1976 | Dibner | 379/38 |
| 4,064,368 | 12/1977 | Dibner | 379/38 |
| 4,068,097 | 1/1978 | Verriest | 379/38 |
| 4,371,751 | 2/1983 | Hilligoss et al. | 379/40 |
| 4,467,142 | 8/1984 | Rupp et al. | 379/45 |
| 4,510,350 | 4/1985 | Wagner et al. | 379/38 |
| 4,523,307 | 6/1985 | Brown et al. | 379/66 |
| 4,524,243 | 6/1985 | Shapiro | 340/573 |
| 4,542,262 | 9/1985 | Ruff | 379/45 |
| 4,571,455 | 2/1986 | Labock et al. | 379/40 |
| 4,577,182 | 3/1986 | Millsap et al. | 340/539 |
| 4,656,319 | 4/1987 | Bially | 379/29 |
| 4,724,538 | 2/1988 | Farrell | 340/539 |
| 4,760,593 | 7/1988 | Shapiro et al. | 379/38 |
| 4,763,349 | 8/1988 | Siegel et al. | 379/38 |
| 4,764,757 | 8/1988 | DeMarco et al. | 340/574 |
| 4,866,764 | 9/1989 | Barker, III | 379/40 |
| 4,884,059 | 11/1989 | Shapiro | 340/514 |
| 4,884,060 | 11/1989 | Shapiro | 340/514 |
| 4,887,291 | 12/1989 | Stillwell | 379/39 |
| 4,908,602 | 3/1990 | Reich et al. | 340/514 |
| 4,918,717 | 4/1990 | Bissonnette et al. | 379/40 |
| 4,993,058 | 2/1991 | McMinn et al. | 379/37 |

FOREIGN PATENT DOCUMENTS

| | | | |
|---|---|---|---|
| 2703923 | 8/1978 | Fed. Rep. of Germany . | |
| 2743476 | 4/1979 | Fed. Rep. of Germany . | |
| 2449934 | 10/1980 | France . | |
| 2576125 | 7/1986 | France . | |
| 2051520 | 1/1981 | United Kingdom | 379/38 |
| 2207836 | 2/1989 | United Kingdom | 379/38 |

OTHER PUBLICATIONS

"The Hasten 500-911", Hasten Systems. Mar. 1988, pp. 5-6.

Primary Examiner—Curtis Kuntz
Assistant Examiner—Stella L. Woo
Attorney, Agent, or Firm—John P. O'Banion

[57] ABSTRACT

A personal emergency response system in which a hand held portable transmitter (12) activates a base unit (14) interfaced with the telephone network (16) to dial 9-1-1 and permit direct communications with the operator (18) at the public safety answering point even though the user (10) is unable to reach a telephone (36). The transmitter (12) activates the base unit (14) as well as optional remote units (48) located throughout the user's residence or place of business. The base unit (14) and remote units (48) include speaker-phone communication capabilities which permit two-way communications between the user (10) and the 9-1-1 system operator (18).

14 Claims, 4 Drawing Sheets

PERSONAL EMERGENCY RESPONSE COMMUNICATIONS SYSTEM

BACKGROUND OF THE INVENTION

1. Field of the Invention

This invention relates generally to personal emergency response systems, and more particularly to a remotely controlled system for activating the enhanced 911 emergency response system and communicating with the 911 dispatcher during an emergency.

2. Description of the Background Art

Various forms of personal alarm systems have been developed which permit the user to send a transmission to a monitoring station during an emergency. Typically the user activates a transmitter or other device located at his or her residence or place of business, and the transmitter in turn activates a remote subscriber station which communicates with the monitoring station at another location. Upon activation of the subscriber unit in response to a predetermined event, an alarm message is transmitted via a communications link to the monitoring station. The monitoring station responds to alarm messages generated by the remote station. Emergency assistance in the form of voluntary responders (e.g, friends, neighbors, etc.) is then sent in response to the alarm received by the monitoring station. Once the voluntary responder arrives on the scene and determines that a life threatening emergency exists, the responder dials 9-1-1 for the victim.

Various forms of communications links are used to permit the remote subscriber station to communicate with the monitoring station. Those communications links include telephone lines, cable television transmission lines, radio frequency paths or dedicated land lines. Most systems utilize telephone lines because they are widely available and require minimal installation expense.

Remote subscriber units typically come in various forms, such as those which are automatically activated upon expiration of a predetermined time period and reset by operation of electrical switches, television sets, radios, refrigerators, stoves or telephones; those which use hard wired activators; and those which use portable transmitters using radio frequency, infrared or ultrasonic transmission media. Most systems utilize a hand held radio frequency transmitter for activating the remote subscriber unit.

Examples of such devices and systems can be found in U.S. Pat. No. 4,510,350 issued to Wagner et al. on Apr. 9, 1985 which discloses a wrist worn transmitter with a push button trigger, and a base receiver unit attached to the telephone lines. Upon activation of the transmitter, the base unit dials the first of up to four stored telephone numbers and plays a digitized message. The recipient of the message can stop or repeat the message using touch tone signals; U.S. Pat. No. 4,524,243 issued to Shapiro on Jun. 18, 1985 which discloses a personal alarm system which is triggered by the failure of the subscriber to activate a reset switch within a predetermined period of time; U.S. Pat. No. 4,064,368 issued to Dibner on Dec. 20, 1977 which discloses a digital dialer-transceiver connected to a telephone line which is triggered by an emergency button or the running out of a timer. When activated, the transceiver transmits identification and alarm codes to a compatible digital transceiver at a monitoring station and at the same time emits an alarm signal at the residence. The monitoring station operator then contacts care-givers who go to the residence and reset the unit; U.S. Pat. No. 3,989,900 issued to Dibner on Nov. 2, 1976 which discloses an alarm system for automatically sending a telephone message or other remote signal in case help is needed by a person residing alone. In one version, the telephone is automatically dialed at predetermined intervals and an audible warning is sounded so that the person can abort the message. In another version, a high speed digital dialer and transmitter are used; U.S. Pat. No. 4,884,059 issued to Shapiro on Nov. 28, 1989 which discloses test equipment for use with emergency response systems wherein subscriber units are activated and signals or messages are sent to a monitoring station via radio or telephone communications links; U.S. Pat. No. 4,908,602 issued to Reich et al. on Mar. 13, 1990 which discloses an apparatus and method for testing a portable held button for an emergency response system; U.S. Pat. No. 4,884,060 issued to Shapiro on Nov. 28, 1989 which discloses a multi-state selection switch for a personal emergency response system; German No. 2703923 which discloses a personalized alarm system which couples an individual with a central monitoring station with a transmitter-receiver. The signals from the transmitter-receiver are passed to the monitoring station containing a facility for timing signals and generating signals requiring a response. The system is readily adapted to allow the generation of a specific range of call signals, that in extreme cases provide automatic connection to the police services; French No. 2449934 which discloses an apparatus for sending prerecorded messages to an emergency service monitoring station; German No. 2743476 which discloses a personal protection system having a portable transceiver with coded functions for transmitting emergency signals to a monitoring station; French No. 2575125 which discloses a portable transmitter with a multi-state warning signal. When the transmitter button is pushed for a short period, a warning of risk is sent. When the button is held down for longer than two seconds, an emergency is declared; U.S. Pat. No. 4,887,291 issued to Stillwell on Dec. 12, 1989 which discloses a monitoring system for annunciating emergencies; U.S. Pat. No. 4,724,538 issued to Farrell on Feb. 9, 1988 which discloses an emergency roadside telephone communications system; U.S. Pat. No. 4,577,182 issued to Millsap et al. on Mar. 18, 1986 which discloses a cellular based radio alarm system; and U.S. Pat. No. 4,656,319 issued to Bially on Apr. 7, 1987 which discloses an alarm system tester for verifying operation of subscriber stations.

Although the foregoing patents describe devices and systems which can dial telephones or send alarm signals, none of them permit the user to communicate directly with the monitoring station operator or, in particular, a 9-1-1 dispatcher during an emergency, via standard telephone lines. Therefore, it is not possible for the monitoring station operator to know the exact nature of a personal emergency. Systems such as these are the source of frequent false alarms and often lengthy delays due to the number or "middle men" involved before the victim receives the proper emergency assistance (e.g., fire, police, paramedics, etc.) Delays of over thirty minutes are not uncommon.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's invention.

SUMMARY OF THE INVENTION

In general terms, the apparatus of the present invention includes a self-contained portable transmitter, a base unit which includes a receiver, decoder, telephone line interface and control circuit, and one or more optional remote speaker/microphone units. During a life threatening emergency or a crime in progress, a person who is injured, physically threatened, or otherwise unable to reach a telephone, can activate the portable transmitter to summon help. The transmitter, which is carried or worn by the user, has an activation button and two annunciators. One annunciator is visual, while the other is audible. When the transmitter is activated, the audible annunciator beeps and the visual annunciator comes on. This feature helps to protect against false alarms resulting from the user inadvertently striking the activation button.

A base unit, which is stationary but can be moved from location to location if necessary, houses a radio receiver responsive to the transmitter. Through the use of pulse code modulation and decoding techniques, both the transmitter and the receiver can be set to any one of up to 262,143 unique codes to eliminate interference from other users. A control module in the base unit links the receiver to a dialer unit programmed to dial 9-1-1, a telephone line interface network, and a speaker and microphone driven by amplifiers in a speakerphone configuration.

Activation of the transmitter causes the control module to take the telephone line "off-hook" and dial 9-1-1. When the 9-1-1 system operator answers, the person requiring assistance can communicate with the system operator even though they are located away from the base unit and could not otherwise reach a telephone. In order to provide complete communicative coverage in the event that the user experiences an emergency in a room where the base unit is not physically located, optional remote speaker/microphone units can be used. These units, which are typically plugged into an A/C power outlet, use a power line carrier communications interface as a link to the base unit and provide equivalent speaker-phone capabilities.

The base unit also continuously monitors the telephone line to determine if an extension telephone is taken "off-hook" and the first three digits of the telephone number 9-1-1 are dialed. In that event, the base unit and remote speaker/microphone units are activated so as to alert persons in their proximity that 9-1-1 has been dialed.

Additionally, a silent mode can be invoked to disable the speakers and audible annunciators used in the system. This mode is particularly suited for retail establishments which are prone to hold-ups and robberies because the intruder will not be alerted by the 9-1-1 system operator, although the 9-1-1 system operator would be able to listen to what was taking place in order to better ascertain the nature of the emergency.

An object of the invention is to provide better and more effective communications between the 9-1-1 operator and a person requiring emergency assistance.

Another object of the invention is to provide better and more effective communications between the 9-1-1 operator and persons at the scene of an emergency who are attempting to render assistance.

Another object of the invention is to provide two-way communications capabilities between the 9-1-1 operator and a person who requires emergency assistance but who is unable to reach a telephone.

Another object of the invention is to provide two-way communications capabilities between the 9-1-1 operator and a person who requires emergency assistance where no telephone is present.

Another object of the invention is to provide a system whereby police, during a hold-up or other type of emergency in a commercial establishment, can determine the nature of the emergency rather than respond only to an alarm.

Another object of the invention is to reduce the frequency of false alarms received by the 9-1-1 operator.

Another object of the invention is to permit persons in a business establishment to directly summon police during an armed robbery or other emergency without alerting the intruder.

Another object of the invention is to permit the police or 9-1-1 operator to monitor audible activity during an armed robbery or hostage situation without alerting the intruder.

Another object of the invention is to reduce the number of deaths resulting from emergencies to which there is no response because the victim is unable to summon assistance.

Another object of the invention is to facilitate verification by the 9-1-1 operator that an emergency exists and assistance is required.

Another object of the invention is to reduce unnecessary emergency responses when a child has inadvertently dialed 9-1-1 and left the telephone off hook.

Another object of the invention is to provide for quicker response time to assist victims of crimes in the home or place of business.

Another object of the invention is to activate video surveillance systems in retail establishments when 9-1-1 is dialed.

Another object of the invention is to provide for quicker response time to assist victims of heart attack, stroke or other life threatening emergencies where response time is crucial.

Another object of the invention is to provide a more affordable emergency response system by eliminating the monthly monitoring fee required by all other systems.

Another object of the invention is to provide assistance to a victim who is unable to speak and unable to reach a telephone.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the system and apparatus generally shown in FIG. 1 through FIG. 5. It will be appreciated that the system and apparatus may vary as to configuration and as to details of the parts without departing from the basic concepts as disclosed herein.

Figure 1:
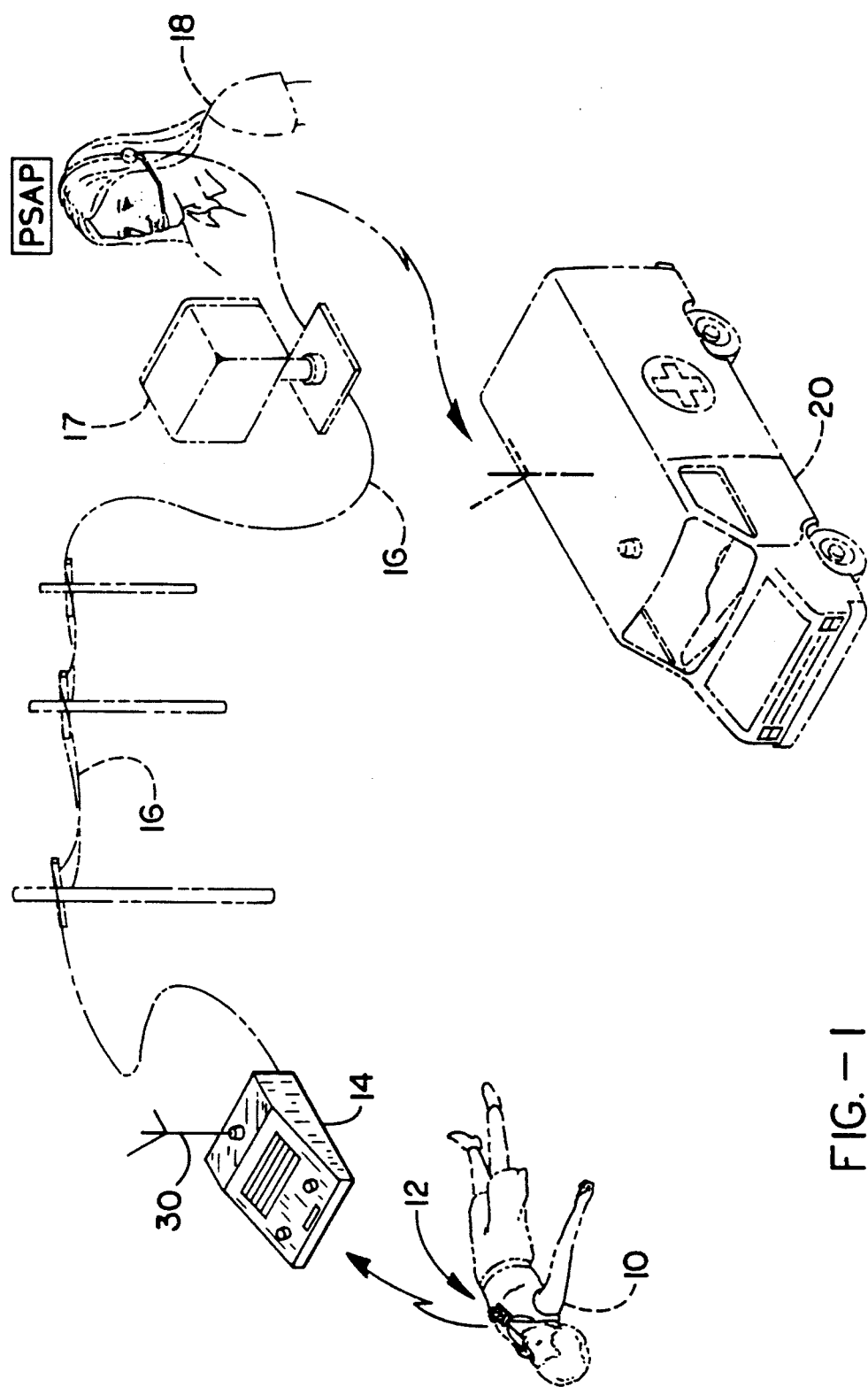
FIG. 1 is a functional block diagram of the present invention.

Referring to FIG. 1, in general terms the system of the present invention permits a user 10 to carry with them a remote transmitter 12 which can be activated in an emergency. Ideally suited for elderly persons living alone, activation of remote transmitter 12 will cause base unit 14, which is interfaced with the telephone lines 16, to automatically dial the enhanced 9-1-1 system operator 18 and activate a two-way speaker phone integrated within base unit 14. The 9-1-1 system operator can then communicate directly with user 10, ascertain the nature of the emergency even though user 10 is unable to reach a telephone, and dispatch the appropriate emergency service 20 in response. Even if the victim is unable to speak, the 9-1-1 system operator will know the address of the victim by the automatic location identifier (ALI) 17, which is part of the enhanced 9-1-1 system.

Figure 2:
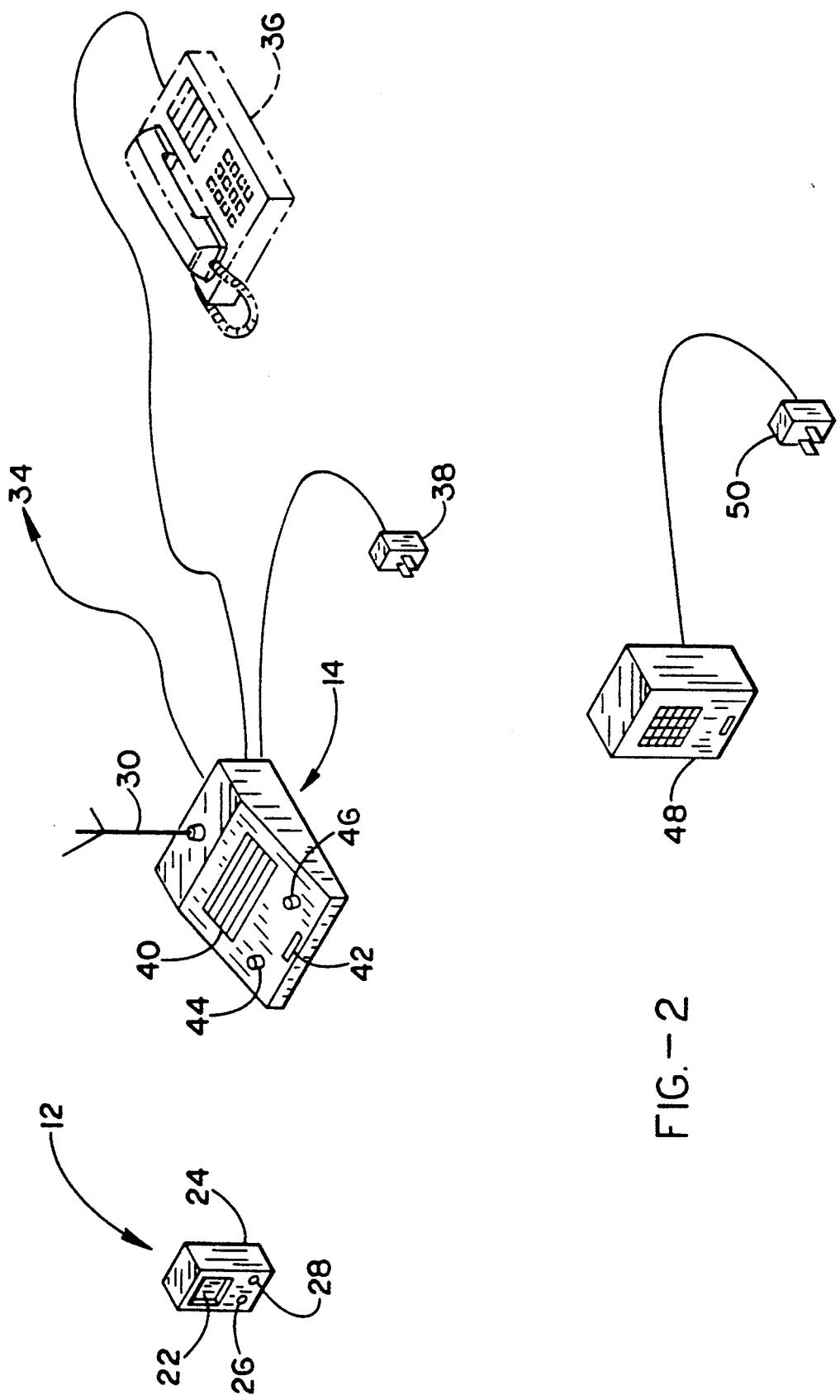
FIG. 2 is a system block diagram of the present invention.

Referring also FIG. 2, remote transmitter 12 includes emergency activation button 22 and a case 24 which houses its associated components. Remote transmitter 12 also includes visual indicator 26 and audible indicator 28, both of which are responsive to activation of remote transmitter 12. Base unit 14 includes antenna 30 for receiving signals from remote transmitter 12 and cable 32 with modular plug 34 for interfacing base unit 14 with the telephone lines 16. Base unit 14 also includes a modular jack 92 (FIG. 4) for connecting a telephone set 36 if desired, and an A/C power connector 38. Speaker 40 is provided to permit the user 10 to listen to communications from the 9-1-1 system operator 18 and microphone 42 is provided to permit the user 10 to talk to the 9-1-1 system operator 18. An emergency bypass switch 44 is provided to permit the user 10 to activate the system without using remote transmitter 12, and a cancel switch 46 is provided to permit the user 10 to terminate the call. Remote speaker/microphone units 48 are installed at various locations throughout the residence or place of business of user 10 so that user 10 can communicate with the 9-1-1 system operator 18 even though user 10 is in another room or otherwise not in proximity to base unit 14. Remote speaker/microphone units 48 include A/C power connector 50.

Figure 3:
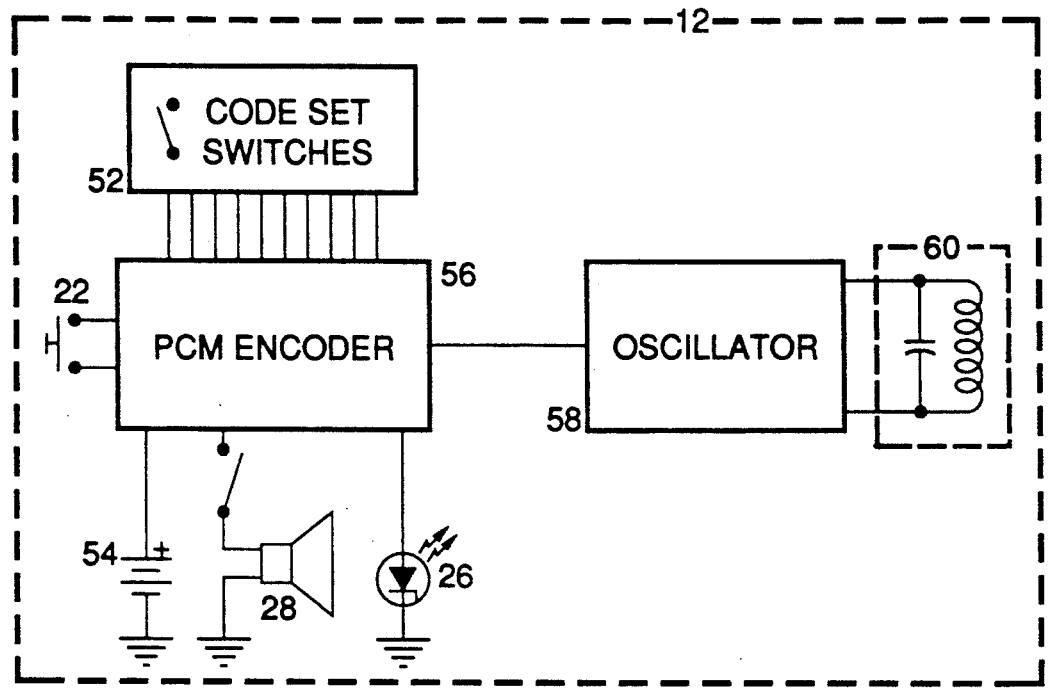
FIG. 3 is a functional block diagram of the remote transmitter shown in FIG. 2.

Referring now to FIG. 3, remote transmitter 12 is a small, portable, battery powered device for transmitting a pulse code modulated (PCM) radio frequency carrier. Remote transmitter 12 incorporates a user selected digital code of 9 to 18 eighteen bits of data to provide 511 to 262,143 different codes. The desired digital code is selected with code set switches 52. The power output of remote transmitter 12 is limited so as to permit use of numerous unlicensed frequencies.

Emergency activation button 22 is recessed into transmitter case 24. Depressing emergency activation button 22 connects power supply 54 which is a battery or the like to a digital PCM encoder 56 and oscillator 58. PCM encoder 56, which is typically an MC145028 or the like, modulates oscillator 58 on and off with the selected digital code. This resultant pulsed radio frequency carrier is then transmitted by means of antenna tank circuit 60 contained within case 24. Visual indicator 26 and audible indicator 28 show that remote transmitter 12 has been activated and, by providing such positive indication that the system has been activated, guard against false alarms which could result from inadvertent activation.

Physical packaging of remote transmitter 12 could take various forms including, but not limited to, a hand held unit, a necklace type pendant, a key chain pendant, a pocket pager type unit, or a wrist watch style unit.

Figure 4:
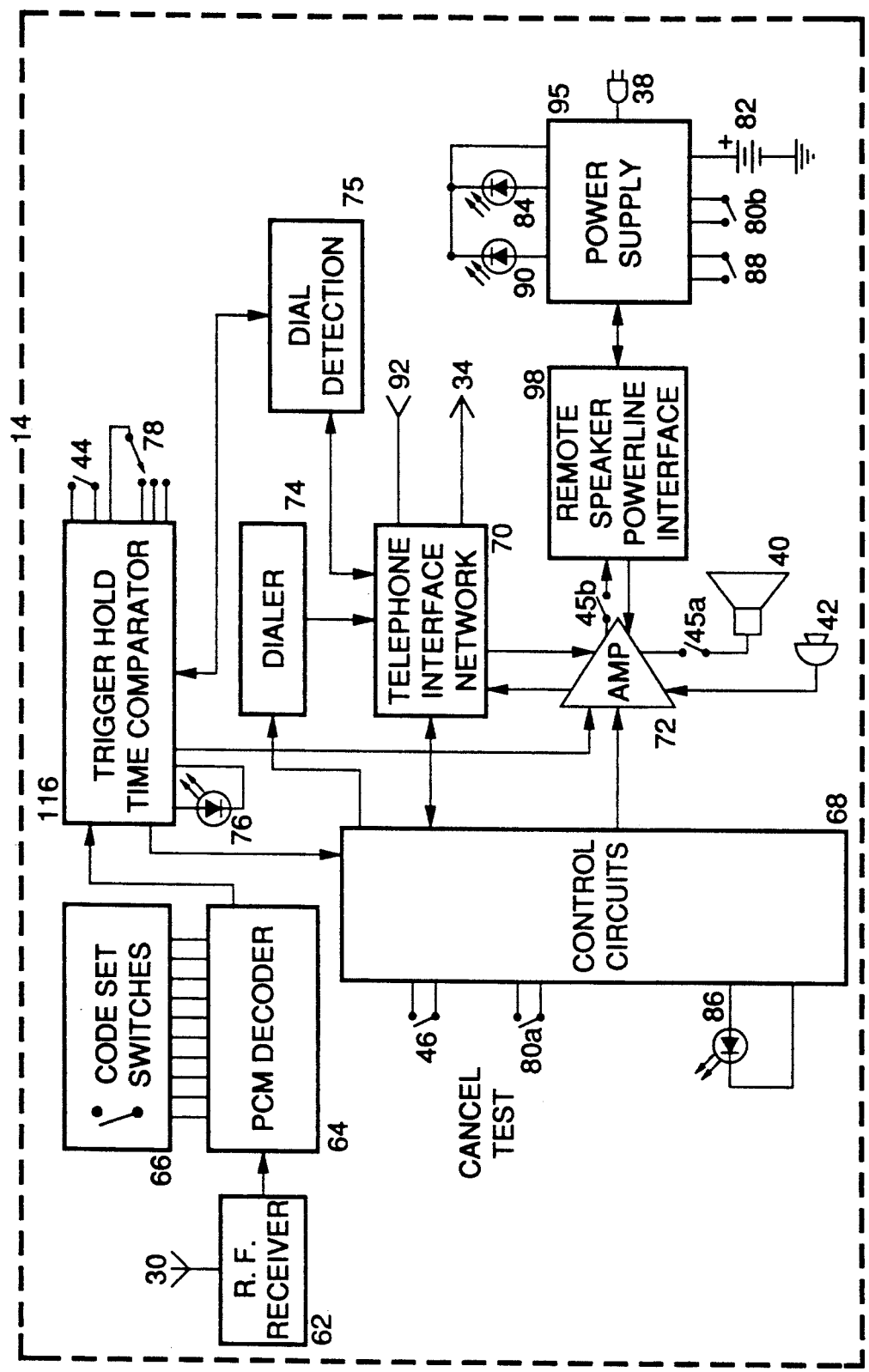
FIG. 4 is a functional block diagram of the base unit shown in FIG. 2.

Referring now to FIG. 4, base unit 14 includes receiver 62 which receives a signal from remote transmitter 12 via antenna 30 and converts the signal to a digital pulse stream. These pulses are decoded by PCM decoder 64, which is all an MC145028 or the like, and compared to a code selected by code set switches 66. If a match is detected, a trigger signal is sent to trigger hold time comparator 116 which serves to sample the duration of the trigger signal. Upon the condition that the trigger signal is active for longer than nominally two seconds, the trigger hold time comparator 116 will send a trigger signal to control circuit 68. Upon receipt of the trigger signal, control circuit 68 takes the telephone interface network 70 "off-hook", enables amplifiers 72, enables speaker 40 and microphone 42, and enables 9-1-1 dialer 74 which dials 9-1-1. When the 9-1-1 system operator 18 answers the call, he or she will be in direct communications with the user 10. Base unit 14 will not disconnect the call until either the 9-1-1 operator 18 hangs up or the user 10 presses cancel switch 46. It should be noted that 9-1-1 dialer 74 is programmed to dial 9-1-1 for use in the United States, but would be programmed to dial the corresponding emergency response system number in other countries.

Base unit 14 also includes several important additional features.

Operation of emergency bypass switch 44 sends a trigger control signal to control circuit 68 equivalent to that when remote transmitter 12 is activated. This permits operation of the system directly from base unit 14.

When control circuit 68 receives a trigger signal from trigger hold time comparator 116, visual indicator 76 flashes on and off and an audible warning signal is emitted from speaker 40 for a period of time which is selected by the user. Typical periods are 5 seconds, 45 seconds and 90 seconds, and are selected by delay select switch 78. After the preset period of time passes, visual indicator 76 remains on constantly and base unit 14 dials 9-1-1 as described above.

Test button 80a, 80b provides two functions. First, while test button 80a, 80b is held down, a battery test mode is entered. If battery 82 is sufficiently charged, then the "battery ok" indicator 84 will come on. Next, a two minute general test mode is entered during which time "test mode" indicator 86 is activated. If either emergency bypass switch 44 or remote transmitter 12 is then activated, base unit 14 will go into operation and the user 10 will be able to hear base unit 14 dialing 9-1-1. However, base unit 10 will immediately cancel the call before it can ring through to the 9-1-1 system operator 18.

If A/C power fails or base unit 14 is unplugged and power switch 88 is in the "on" position, battery 82 will power base unit 14 and the "power on" indicator 90 will flash. Battery 82, which is typically a nicad type, is continuously charged while base unit 14 is plugged into an A/C power supply.

Modular telephone cable 32 and jack 34 are provided to connect base unit 14 to a telephone line. Modular jack 92 is provided for connecting a standard telephone set 36 to base unit 14.

Figure 5:
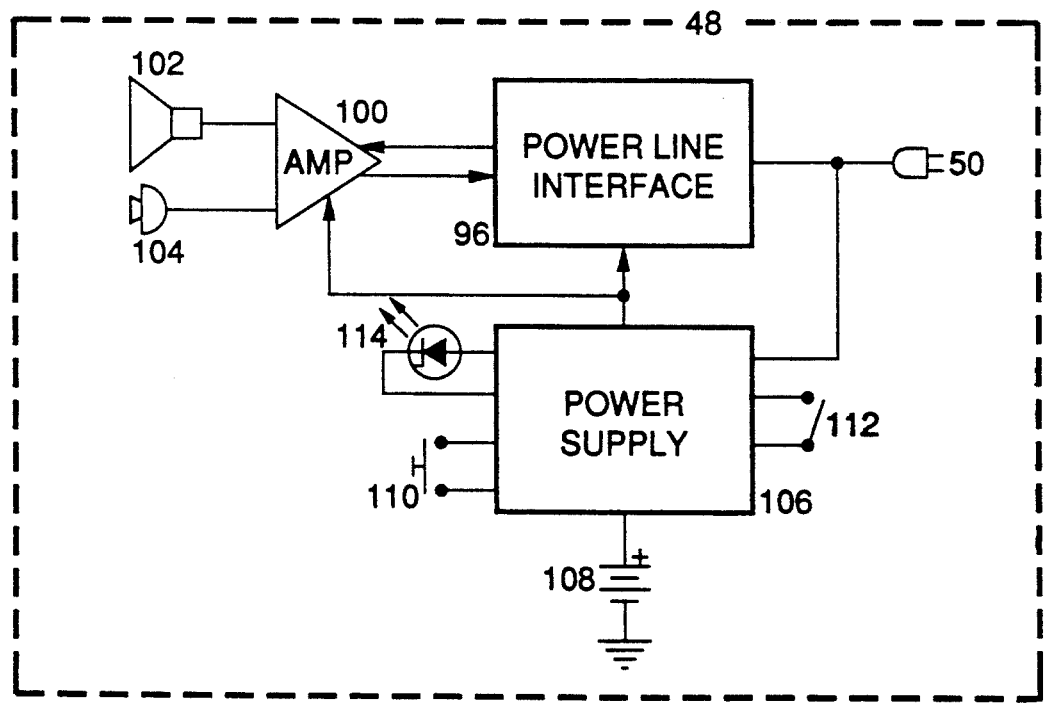
FIG. 5 is a functional block diagram of the remote speaker/microphone unit shown in FIG. 2.

Referring also to FIG. 5, any number of remote speaker/microphone units 48 can be installed throughout a house or place of business. Remote speaker/microphone units 48 could be hard wired to base unit 14, or utilize power line carrier signals and connect to the existing A/C wiring in the building. Where power line carrier signals are utilized, remote speaker/microphone unit 48 would include power line interface 96 and base unit 14 would include a similar power line interface 98. Base unit 14 includes amplifiers 100, speaker 102, microphone 104, power supply 106, battery 108, battery test switch 110, power switch 112, and power indicator 114.

Enhancements and additional features incorporated into the system include the following.

A "silent" mode would typically be used in retail establishments which are prone to hold-ups and robberies. Referring to FIG. 3, annunciator switch 23 is operated to disable audible indicator 28 on remote transmitter 12. Referring to FIG. 4, speaker switch 45a, 45b is operated to disable speaker 40 on base unit 14 as well as the audio input to power line interface 98, thereby disabling speaker 102 on remote speaker/microphone units 48. In this mode, the user could dial 9-1-1 by activating remote transmitter 12 without alerting the intruder. While the 9-1-1 system operator 18 would not be able to talk to the user 10, the 9-1-1 system operator 18 would be able to listen to what was taking place in order to better ascertain the nature of the emergency. Also, the ALI 17 would show the name and address of the retail establishment thereby alerting the 9-1-1 system operator that the call might be a crime in progress. Video surveillance cameras (not shown) could also be activated when the system is triggered in this mode of operation.

Referring to FIG. 2 and FIG. 4, dial detection circuit 75 continuously monitors the status of the telephone line 16 through telephone interface network 70. When telephone line 16 is taken "off-hook" by telephone set 36 or any standard telephone connected to telephone line 16, dial detection circuit 75 decodes the touch tone dialing signals. If the first three digits dialed are 9-1-1, speaker 40 and microphone 42 are enabled in base unit 14, as well as remote speaker/microphone units 48. This feature will alert anyone in proximity to either base unit 14 or a remote speaker/microphone unit 48 that a telephone has been used to dial 9-1-1. In this manner, if 9-1-1 is improperly dialed by a child the child's parent can cancel the call before the 9-1-1 system operator dispatches assistance. If base unit 14 receives a normal activation signal from remote transmitter 12 or bypass switch 44, dial detection circuit 75 is disabled and the system will function normally as previously described.

Referring to FIG. 3 and FIG. 4, to reduce the likelihood of false triggers due to the user accidentally pressing emergency activation button 22 on remote transmitter 12 or emergency bypass switch 44 on base unit 14, trigger hold time comparator 116 in the system disregards any trigger signal with a duration less than a predetermined period. Typically trigger signals with a duration less than nominally two seconds would be disregarded.

Other optional enhancements and features include a mode for programming base unit 14 to dial numbers other than 9-1-1, and integrating base unit 14 into a telephone unit with a hand set and touch tone dial keypad. Accordingly, it will be seen that this invention provides an apparatus and system for efficient, reliable and effective notification of life threatening emergencies to operators of the 9-1-1 emergency response system. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A personal emergency response communications system, comprising:
   (a) transmitting means for transmitting a signal indicative of an emergency, said transmitting means adapted for ready transport by the user thereof, said transmitting means including a manually operable switch for activation thereof by said user;
   (b) receiving means for receiving said transmitted signal;
   (c) control means for accessing a telephone line and dialing 9-1-1, said control means responsive to said received signal;
   (d) comparator means for comparing the duration of said transmitted signal with a predetermined period of time and preventing said control means from accessing said telephone line unless the duration of said transmitted signal exceeds said predetermined period of time;
   (e) telephone line interface means for connecting said control means to said telephone line;
   (f) communications means for audible communications between said user and a 9-1-1 system operator, said communications means coupled to said control means, said communications means operatively responsive to said control means, said communications means coupled to said telephone line interface means;
   (g) said receiving means, said control means, said comparator means, said telephone line interface means, and said communications means included within a base unit; and
   (h) dial detection means for accessing said telephone line and activating said communications means in response to said telephone line being taken off-hook and 9-1-1 being dialed form an extension telephone coupled to said telephone line, said dial detection means coupled to said telephone line interface means, said dial detection means included within said base unit.

2. The system of claim 1, further comprising silencing means for preventing said user from receiving audible communications from said 9-1-1 system operator while permitting said 9-1-1 system operator to receive audible communications from said user, said silencing means included within said base unit, said silencing means operable by said user.

3. The system of claim 1, further comprising:
   (a) audible annunciating means for alerting said user to activation of said transmitting means;
   (b) visual annunciating means for alerting said use to activation of said transmitting means; and (c) means for selectively disabling said audible annunciating means.

4. The system of claim 1, further comprising at lest one remote communications unit, said remote communications unit operatively responsive to said control means, said remote communications unit including means for audible two-way communications between said user and said 9-1-1 system operator.

5. The system of claim 1, wherein said transmitting means comprises a pulse code modulated radio frequency transmitter.

6. The system of claim 1, wherein said receiving means comprises:
   (a) a radio frequency receiver; and
   (b) a pulse code modulation decoder.

7. An apparatus for direct telephone communication with a emergency response center during a life threatening emergency, comprising:
   (a) a radio frequency transmitter, said transmitter including an activation switch;
   (b) a radio frequency receiver;
   (c) a telephone dialer, said telephone dialer coupled to said receiver, said telephone dialer responsive to activation of said transmitter;
   (d) a telephone line interface, said telephone line interface coupled to said receiver, said telephone line interface coupled to said telephone dialer;
   (e) a speaker, said speaker coupled to an amplifier, said amplifier coupled to said telephone line interface;
   (f) a microphone, said microphone coupled to said amplifier; and
   (g) silencing means for disabling said speaker while said microphone is active, said silencing means operatively coupled to said speaker;
   (h) said radio frequency receiver, said telephone dialer, said telephone line interface, said speaker, said microphone, and said silencing means included within a base unit, said silencing means operable by a user from said base unit; and
   (i) dial detection means for accessing a telephone line coupled to said telephone line interface and activating said communications means in response to said telephone line being taking off-hook and 9-1-1 being dialed from an extension telephone coupled to said telephone line, said dial detection means coupled to said telephone line interface means, said dial detection means included within said base unit.

8. The apparatus recited in claim 7, wherein said transmitter includes a visual annunciator, said visual annunciator responsive to said activation switch, an audible annunciator, said audible annunciator responsive to said activation switch, and an annunciator switch, said annunciator switch operatively coupled said audible annunciator to enable and disable said audible annunciator.

9. The apparatus recited in claim 7, further comprising
   comparator means for comparing the duration of a signal from said transmitter with a predetermined period of time and preventing operation of said telephone dialer unless the duration of said transmitted signal exceeds said predetermined period of time, said comparator means included within said base unit.

10. The apparatus recited in claim 7, further comprising at least one remote communications unit, said remote communications unit including a power line carrier interface, said remote communications unit operatively responsive to said receiver, said remote communications unit including a speaker, said remote communications unit including a microphone.

11. An apparatus for communicating with the operator of the 9-1-1 emergency response system for requesting assistance during an emergency in which the user is unable to physically reach a telephone, comprising:
   (a) a self-contained portable radio frequency transmitter, said transmitter including an activation switch, said transmitter including a pulse code modulation encoder;
   (b) a base unit, said base unit including a radio frequency receiver, said base unit including a pulse code modulation decoder coupled to said radio frequency receiver, said base unit including a control module, said control module coupled to said pulse code modulation decoder;
   (c) a telephone line interface network, said telephone line interface network coupled to said control module;
   (d) a telephone dialer, said telephone dialer coupled to said control module, said telephone dialer coupled to said telephone line interface network, said telephone dialer programmed to dial 9-1-1 upon activation of said transmitter;
   (e) a least one speaker coupled to an amplifier, said amplifier coupled to said telephone line interface network;
   (f) at least one microphone coupled to said amplifier, whereby activation of said transmitter causes said base unit to dial 9-1-1 permitting a user to communicate with said operator of said 9-1-1 emergency response system; and
   (g) dial detection means for activating said speaker and microphone in response to a telephone line coupled to said telephone line interface network being taken off-hook and 9-1-1 being dialed by an extension telephone coupled to said telephone line, said dial detection means coupled to said telephone line interface network.

12. The apparatus recited in claim 11, further comprising:
   (a) a power line carrier communications interface, said power line carrier communications interface coupled to said amplifier;
   (b) at least one remote communications unit, said remote communications unit including a power line carrier communications interface, said remote communications unit including a speaker, said remote communications unit including a microphone, said remote communications unit operatively response to said base unit.

13. The apparatus recited in claim 11, further comprising trigger sampling means for comparing the duration of a radio frequency signal emitted from said transmitter with a predetermined period of time and preventing operation of said telephone dialer unless the duration of said transmitted signal exceeds said predetermined period of time, said trigger sampling means coupled to said decoder, said trigger sampling means coupled to said control module, said control module responsive to said trigger sampling means.

14. The apparatus recited in claim 11, further comprising:
   (a) a visual annunciator, said visual annunciator responsive to said activation switch;
   (b) an audible annunciator, said audible annunciator responsive to said activation switch;
   (c) a bypass switch, said control unit operatively responsive to said bypass switch; and
   (d) a cancel switch, said cancel switch coupled to said control module, said cancel switch deactivating said base unit.

* * * * *